C. C. LE FEVER.
AGRICULTURAL IMPLEMENT.
APPLICATION FILED JAN. 22, 1917.
1,250,329.
Patented Dec. 18, 1917.
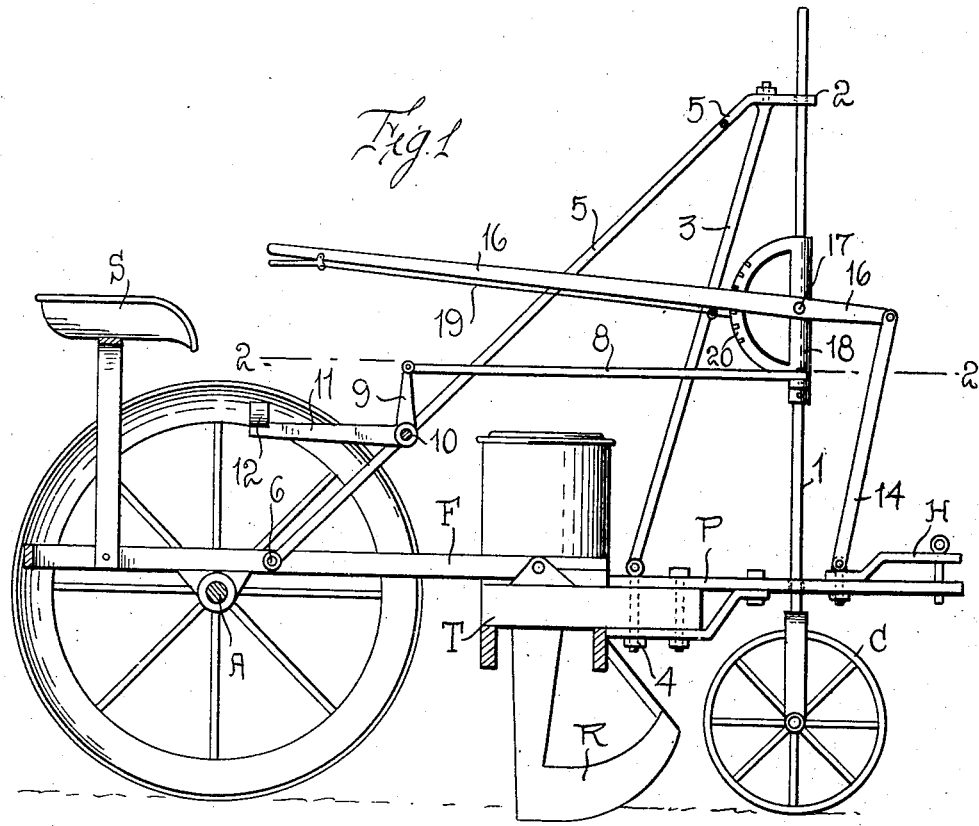
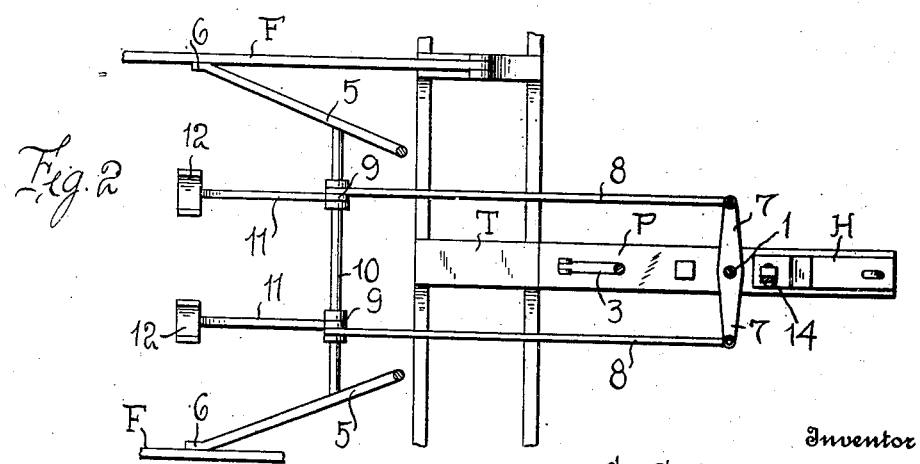
Inventor
C. C. LeFever
By Watson E. Coleman
Attorney

UNITED STATES PATENT OFFICE.

CLAUDE C. LE FEVER, OF LISCOMB, IOWA.

AGRICULTURAL IMPLEMENT.

1,250,329.  Specification of Letters Patent.  Patented Dec. 18, 1917.

Application filed January 22, 1917. Serial No. 143,734.

*To all whom it may concern:*

Be it known that I, CLAUDE C. LE FEVER, a citizen of the United States, residing at Liscomb, in the county of Marshall and State of Iowa, have invented certain new and useful Improvements in Agricultural Implements, of which the following is a specification, reference being had to the accompanying drawings.

This invention relates to certain improvements in agricultural implements and more particularly of a planter type; and it is an object of the invention to provide an attachment of novel and improved construction adapted to be engaged with a portable agricultural implement for readily and effectively controlling the direction of travel thereof and also for vertically adjusting the ground engaging member.

The invention consists in the details of construction and in the combination and arrangement of the several parts of my improved agricultural implement whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings, wherein Figure 1 is a vertical sectional view taken through a corn planter showing an embodiment of my invention applied thereto; and Fig. 2 is a sectional view taken substantially on the line 2—2 of Fig. 1.

As disclosed in the accompanying drawings, F denotes a frame of a corn planter of any ordinary or preferred construction and which is operatively engaged at its rear portion with a wheel-supported axle A. The forward portion of the frame F at substantially its transverse center is provided with a forwardly directed stub tongue T having suitably secured to its upper surface the plate P. The plate P extends in advance of the tongue T and is in longitudinal alinement therewith.

1 denotes an elongated post loosely disposed through the plate P and provided at its lower end with the caster wheel C. The upper end portion of the post 1 is also loosely directed through the supplemental plate 2 in predetermined vertical spaced relation to the plate P. The plate 2 is maintained in its desired position through the medium of the brace member 3 which has its lower end portion loosely engaged with the eye bolt 4 directed through the plate P and the tongue T.

The rear portion of the plate 2 is provided with the downwardly inclined diverging brace rods 5 which have their lower end portions suitably secured, as at 6, to the side members of the frame F at a point preferably in close proximity to the axle A.

The post 1 has suitably affixed thereto at a predetermined point above the plate P, the oppositely directed arms 7, and to the outer extremity of each of said arms 7 is operatively engaged the bar 8 which extends rearwardly of the planter and is operatively engaged with the upstanding arm 9 mounted for rocking movement upon the bar or rod 10 supported by and interposed between the lower end portions of the brace rods 5 at a predetermined distance above the frame F. The arm 9 has also connected therewith the rearwardly directed lever 11 provided at its rear or free extremity with the pedal 12.

The occupant of the seat S engages the pedals 12 and by exerting pressure on either of said pedals it will be perceived that the direction of travel of the planter may be readily and conveniently controlled. This manual steering of the planter is of material advantage in view of the fact that it is much easier for the driver to guide the planter straight as he does not have to depend upon the draft animals. It will also be self-evident that after making a turn at the end of a row the driver can readily and quickly put his planter in requisite position.

The caster C is also adapted to afford a support for the forward portion of the planter so that the strain thereof is taken off of the draft animals, and as herein disclosed, the plate P preferably at a point in advance of the post 1 has pivotally engaged therewith the upwardly disposed link 14 which is also pivotally engaged with the forward end of the lever 16. The lever 16 at a predetermined point inwardly of its forward end is pivotally engaged, as at 17, with the sleeve 18 through which the post 1 is loosely directed. The lever 16 is of such a length as to have its rear end terminate in close proximity to the seat S. The lever 16 is also provided with a conventional latch mechanism 19 coacting with the rack 20 herein disclosed as carried by the sleeve 18, whereby it will be perceived that the frame F may be readily adjusted about the axle A in accordance with the requirements of practice and effectively maintained in such adjustment. This latter adjustment in the present instance is to control the depth of penetration of the runners R of the planter.

It is also to be noted that the forward or outer end portion of the plate P is provided with a hitch H and whereby the draft animals may be readily engaged to transport the planter. As is disclosed in the accompanying drawings, the hitch H is adapted to coact with a conventional doubletree, although I do not wish to be understood as limiting myself in this particular respect.

From the foregoing description, it is thought to be obvious that an agricultural implement constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice, except as hereinafter claimed.

I claim:

1. In combination with a portable frame, a plate secured to and extending beyond the forward end portion of the frame, a post loosely directed through said plate, a wheel carried by the lower end portion of the post, a second plate positioned above the first named plate and through which the post is also loosely directed, brace rods extending from the second named plate to the frame, means for rotating the post in opposite directions, a bar interposed between the first named brace rods, rock levers supported by the bar and provided with operating means, oppositely directed arms carried by the post, and connections between the rock arms and the arms of the post whereby the post is caused to operate upon movement of either of the rock arms.

2. In combination with a portable frame, a plate secured to and extending beyond the forward end portion of the frame, a post loosely directed through the plate, a wheel carried by the lower end portion of the post, a second plate positioned above the first named plate and through which the post is also loosely directed, brace rods extending from the second named plate to the frame, means for rotating the post in opposite directions, a lever pivotally supported by the post, and a connection between the lever and the plate whereby the frame may be elevated.

In testimony whereof I hereunto affix my signature in the presence of two witnesses.

CLAUDE C. LE FEVER.

Witnesses:
A. P. MASON,
E. A. CORFE.